United States Patent [19]

Gazard et al.

[11] 4,153,925
[45] May 8, 1979

[54] DIELECTRIC FORMED BY A THIN-LAYER POLYMER, A PROCESS FOR PRODUCING SAID LAYER AND ELECTRICAL CAPACITORS COMPRISING THIS DIELECTRIC

[75] Inventors: Maryse Gazard; Jean-Claude Dubois, both of Paris, France

[73] Assignee: Thomson-CSF, Paris, France

[21] Appl. No.: 875,575

[22] Filed: Feb. 6, 1978

[30] Foreign Application Priority Data

Feb. 8, 1977 [FR] France ............................. 77 03477

[51] Int. Cl.$^2$ .................. H01G 4/18; B05D 3/06; B05D 5/12
[52] U.S. Cl. ..................................... 361/323; 29/586; 204/156; 427/40; 427/41; 427/81; 427/248 H
[58] Field of Search .................. 427/39, 40, 41, 79, 427/81, 248 H; 204/169, 170, 156; 29/586; 156/184; 361/301, 323

[56] References Cited

U.S. PATENT DOCUMENTS

| | | | |
|---|---|---|---|
| 3,252,830 | 5/1966 | Cummin et al. | 361/323 X |
| 3,311,801 | 3/1967 | Pintell | 361/323 |
| 3,318,790 | 5/1967 | Carbajal et al. | 427/41 |
| 3,518,108 | 6/1970 | Heiss, Jr. et al. | 427/41 |
| 3,776,762 | 12/1973 | Bernath | 427/41 X |
| 3,813,266 | 5/1974 | Porta et al. | 427/81 |
| 3,940,506 | 2/1976 | Heincke | 427/38 |
| 3,991,451 | 11/1976 | Maruyama et al. | 361/323 X |
| 4,013,532 | 3/1977 | Cormia et al. | 427/41 X |
| 4,054,680 | 10/1977 | Sharbaugh et al. | 427/41 X |

FOREIGN PATENT DOCUMENTS

| | | |
|---|---|---|
| 677581 | 1966 | Belgium. |
| 1497936 | 1967 | France. |
| 2124397 | 1972 | France. |
| 1012746 | 1965 | United Kingdom. |

OTHER PUBLICATIONS

IBM Technical Disclosure Bulletin, vol. 19, No. 4, Sep. 1976, p. 1400.

*Primary Examiner*—Michael F. Esposito
*Assistant Examiner*—Thurman K. Page
*Attorney, Agent, or Firm*—Cushman, Darby & Cushman

[57] ABSTRACT

A dielectric thin layer consisting of polymerized perfluoro-2-butene:

$$(CF_3-CF=CF-CF_3)_n$$

presenting very good characteristics for production of single or multi-layer capacitors, obtained with a rapid deposition by glow discharge in an a.c. electrical field. The glow discharge is carried out in the gaseous phase of perfluoro-2-butene under highly reduced pressure and an a.c. voltage of 300 volts, the maximum rate of layer formation (0.7 micron per minute) being obtained for a frequency of 13.56Mc/s, at a temperature of 0° C. under a pressure of 0.1 Torr when the useful power of the glow discharge is of 5 to 10 watts.

4 Claims, 1 Drawing Figure

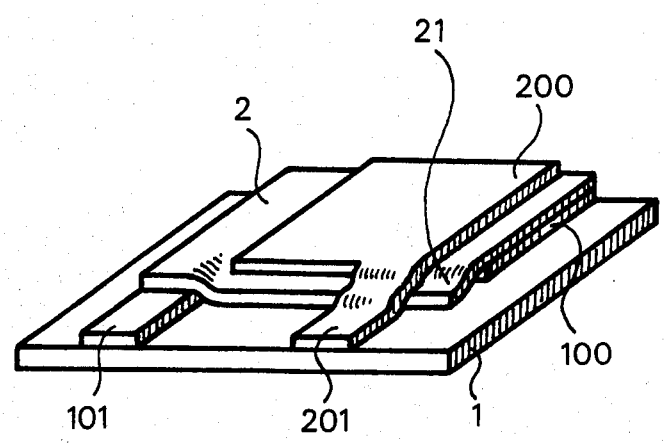

DIELECTRIC FORMED BY A THIN-LAYER POLYMER, A PROCESS FOR PRODUCING SAID LAYER AND ELECTRICAL CAPACITORS COMPRISING THIS DIELECTRIC

BACKGROUND OF THE INVENTION

This invention relates to dielectrics of organic polymers capable of being used in the form of thin layers. The invention also relates to the process for producing the thin layers, to the use of this process for the production of electrical capacitors and to the capacitors having one or more dielectric layers obtained by this process.

It is known that a thin layer of polymer having interesting dielectric properties can be obtained from organic compounds by processes which may be divided into three categories:

First-category processes: a thin layer of polymer can be obtained by immersion of a substrate in a solution of this organic polymer; however, this process is difficult to carry out on an industrial scale for mass production purposes, particularly in the case of capacitors.

Second-category processes: it is known that homogeneous and uniform layers of dielectric can be obtained by the electron bombardment or by the ultraviolet radiation of an organic monomer; however, the rate at which the layer is formed is very low, amounting to around ten Angstroms per minute.

Third-category processes: a layer of polymer growing at a rate of a few hundred to a few thousand Angstroms per minute can be obtained by glow discharge in a gaseous phase of the monomer; however, the dielectric obtained in this way generally does not have all the requisite qualities, namely:

adequate thermal stability, the dielectric properties disappearing beyond a certain temperature range;

sufficiently low dielectric losses, particularly at high frequencies;

a low temperature coefficient, the capacitance varying to a greater or lesser extent as a function of temperature and frequency;

a sufficiently high electrical breakdown field.

According to the present invention, it is possible by using a process of the third category to obtain a layer of dielectric having a range of properties generally better than that of known polymers at a growth rate which is amongst the quickest.

DETAILED DESCRIPTION OF THE INVENTION

The dielectric according to the invention is the product of the polymerisation of an organic compound corresponding to the formula:

$CF_3-CF=CF-CF_3$ (perfluoro-2-butene)

polymerisation being obtained by subjecting said compound in the gaseous phase to an alternating electrical field capable of creating a glow discharge.

The invention will be better understood and other features thereof will become apparent from the following description and the accompanying drawing which is a perspective view of a capacitor having a single dielectric layer.

The dielectric layer according to the invention is produced from perfluoro-2-butene ($C_4F_8$) corresponding to the above indicated formula, used for example in its commercially available form, i.e a liquefied gas contained in special containers.

The gas is introduced into a conventional glow discharge apparatus comprising a vacuum chamber and a discharge chamber forming part of the vacuum chamber. The discharge chamber is provided with a fixed insulated electrode, to which voltage may be applied, and a displaceable electrode which is grounded. The fixed electrode receives a substrate which is intended to receive the deposit resulting from the formation of polymer in the gas situated between the electrodes. The gas pressure is reduced to a value from 0.05 to 0.3 Torr.

There is then applied to the fixed electrode an electrical a.c voltage having a frequency in the range from 25 c/s to 15 Mc/s, for example one of the following two frequencies:

1000 c/s for operation at relatively low frequencies;

13.56 Mc/s for operation at high industrial frequencies.

Either the value of the voltage or the position of the displaceable electrode is adjusted to obtain the glow discharge. The glow discharge is produced for example for an a.c voltage having an effective value of 300 volts and for a pressure of 0.1 Torr prevailing between electrodes spaced 3 cm apart from one another.

A deposit of polymer is obtained in the form of a thin, uniform and homogeneous layer. To recover this deposit, a substrate is previously placed on the fixed electrode of the discharge apparatus.

This polymer is highly crosslinked. It is insoluble in the solvents normally used for organic compounds and is resistant to the usual chemical agents.

The rate at which the layer is formed amounts to between 4000 and 7000 Angstroms per minute for a pressure of 0.1 Torr and a discharge consuming a power of from 5 to 10 watts per square centimeter of electrode. The power is adjusted by acting on the spacing between the electrodes and on the value of the voltage. The growth rate is greater, the closer this power is to 5 watts/cm$^2$.

An increase in the temperature of the substrate produces a reduction in the growth rate of the layer. The growth rate of the layer is higher than the values already mentioned when the substrate is cooled to around 0° C. A growth rate of the thickness of the layer of the order of 0.7 micron per minute is obtained in this way, the a.c voltage having a frequency of 13.56 Mc/s.

The invention is applicable to the production of capacitors having one or more layers of dielectric separated by metal plates.

BRIEF DESCRIPTION OF THE DRAWINGS

The attached drawing is a perspective view of a capacitor having a single dielectric layer according to the present invention.

DETAILED DESCRIPTION OF THE DRAWING

A capacitor is shown by way of example in the accompanying drawing. It comprises a substrate 1 (of glass, ceramic, plastic, possibly even metal), a first plate 100 having an appendage 101 intended to act as a connection electrode. A layer 2 of polymer according to the invention is arranged on this plate 100, projecting distinctly beyond it on the side of the electrode 101 by a portion 21 of polymer which, however, covers only a very small part of the electrode 101. A second plate 200 is deposited onto the layer 2 of polymer, only projecting beyond it by a portion 201 which is deposited onto the substrate 1 and which performs a similar function to the electrode 101.

The process for producing a capacitor such as illustrated comprises three main steps:

First step: forming the plate 100 by the deposition of a metal layer onto the substrate 1. This deposit may be formed for example by the vacuum evaporation of aluminium after the previous application of a metal mask to define the contours of the armature and to protect the zone beyond those contours against the deposition of metal.

Instead of applying a metal mask, a mask of resin may be applied by photoetching.

Second step: forming the layer of polymer 2 by the glow discharge process described above. A metal mask or a resin mask has to be applied beforehand to the substrate covered by the plate 100 in order to define the surface of the desired layer. The excess of polymer deposited at the periphery is eliminated either by removing the mask or by dissolving the resin of the mask.

Third step: forming the plate 200. The step is similar to the first step.

A "multilayer" capacitor may be formed from the capacitor produced during three steps described above by subjecting it to the following operations:

depositing an additional layer of polymer in the same way as in the second step without covering the electrodes 101 and 201, forming an additional plate in the same way as in the first step, the plate partly covering the additional layer of polymer and the major part of the electrode 101, repeating the preceding operations, the plates formed forming layers alternately on the electrode 201 and on the electrode 101, the "multilayer" capacitor as a whole having only a single pair of electrodes.

Further advantages afforded by the invention include the following properties of the dielectric:

a resistivity of the order of $10^{14}$ ohm-cm;

a permittivity of the order of 3;

the tangent of the dielectric loss angle of the order of $3.10^{-3}$, which is substantially invariable with frequency (between 1 c/s and 100 Kc/s);

an electrical breakdown field of greater than 200 volts per micron;

a relative capacitance variation coefficient as a function of temperature of the order of $10^{-4}$ per degree Celsius in a range from $-65°$ C. to $+150°$ C.;

a low variation in the loss angle from ambient temperature 20° to 150° C.;

a thermal stability from $-100°$ C. to $+300°$ C.

An electrical capacitance of 2000 pF may be accommodated in a dielectric occupying a space measuring 6 mm $\times$ 6 mm for a thickness of the order of half a micron.

What we claim is:

1. A process for producing a dielctric thin layer consisting of polymerized perfluoro-2-butene, comprising the steps of:
   (a) introducing into a glow discharge apparatus a substrate intended to receive said dielectric layer and monomeric perfluoro-2-butene in the gaseous phase;
   (b) reducing the pressure of said gaseous phase in the range from 0.05 to 0.3 Torr in said apparatus;
   (c) creating a glow discharge under an a.c voltage of frequency ranging from 25 c/s to 15 Mc/s;
   (d) maintaining the glow discharge for a period of time calculated as a function of the rate of formation of the layer, said rate being from 4000 to 7000 Angstroms per minute.

2. A process as claimed in claim 1, wherein said pressure is about 0.1 Torr, said apparatus being operated so as to consume in the glow discharge a useful power of 5 to 10 Watts.

3. An electrical capacitor containing at least one layer of dielectric polymerized perfluoro-2-butene according to the process of claim 1.

4. A process for producing a capacitor having a plurality of thin dielectric perfluoro-2-butene thereon applied at a rapid rate, said process comprising the steps of:
   (a) depositing a metal layer on a substrate;
   (b) forming a layer of polymer on the layer deposited in the preceding step by glow discharge in a gaseous phase of monomeric perfluoro-2-butene under conditions of reduced pressure of 0.05 to 0.3 Torr, at an a.c. voltage frequency ranging from 25 c/s to 15 Mc/s so as to form said layer at a rate of from 4000 to 7000 Angstroms per minute; and thereafter
   (c) depositing a second metal layer on the layer of polymer deposited in step (b).

* * * * *